United States Patent
Yang et al.

(10) Patent No.: US 11,631,080 B2
(45) Date of Patent: Apr. 18, 2023

(54) CROSS-CHAIN COMMUNICATION METHOD, DEVICE AND STORAGE MEDIUM THEREOF

(71) Applicant: Beijing University of Posts and Telecommunications, Beijing (CN)

(72) Inventors: Hui Yang, Beijing (CN); Shuai Dong, Beijing (CN); Qiuyan Yao, Beijing (CN); Bowen Bao, Beijing (CN); Chao Li, Beijing (CN); Zhengjie Sun, Beijing (CN); Jie Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 201 days.

(21) Appl. No.: 17/145,674

(22) Filed: Jan. 11, 2021

(65) Prior Publication Data
US 2022/0164795 A1   May 26, 2022

(30) Foreign Application Priority Data

Nov. 23, 2020  (CN) .......................... 202011324624.0

(51) Int. Cl.
  *G06Q 20/40* (2012.01)
  *H04L 9/06* (2006.01)
(52) U.S. Cl.
  CPC ......... *G06Q 20/401* (2013.01); *H04L 9/0637* (2013.01); *G06Q 2220/00* (2013.01); *H04L 2209/56* (2013.01)
(58) Field of Classification Search
  CPC ............. G06Q 20/401; G06Q 2220/00; G06Q 40/04; G06Q 20/027; G06Q 20/065;
  (Continued)

(56) References Cited

U.S. PATENT DOCUMENTS

| 9,401,142 | B1 * | 7/2016 | Rothwell | ............... G06Q 50/01 |
| 2014/0297558 | A1 * | 10/2014 | Karibe | ............... G06Q 30/0282 |
| | | | | 705/347 |
| 2018/0121909 | A1 * | 5/2018 | Christidis | ............ G06Q 20/383 |
| 2019/0253240 | A1 | 8/2019 | Treat et al. | |
| 2019/0347657 | A1 * | 11/2019 | Guo | ........................ G06Q 20/10 |
| 2019/0387009 | A1 * | 12/2019 | Kondaveeti | ......... H04L 63/1425 |

(Continued)

FOREIGN PATENT DOCUMENTS

| CN | 107730262 A | * | 2/2018 | ......... G06Q 20/4016 |
| CN | 109345387 A | | 2/2019 | |

(Continued)

OTHER PUBLICATIONS

David F. Gleich, Pagerank Beyond the Web, Jul. 2014, arXiv (Year: 2014).*

(Continued)

*Primary Examiner* — Neha Patel
*Assistant Examiner* — Chunling Ding
(74) *Attorney, Agent, or Firm* — Westbridge IP LLC

(57) ABSTRACT

Disclosed is a cross-chain communication method. In this method, a first edge node of a first blockchain receives a first transaction request and validates the first transaction request; on condition that the first transaction request passes the validation, the first edge node will send the first transaction request to a notary node group; the notary node group determines at least one target notary node according to a preset criterion; the at least one target notary node validates the first edge node and a second edge node of a second blockchain corresponding to the first transaction request; and on condition that both the first edge node and the second edge node pass the validation, the first edge node will set up a cross-chain communication with the second edge node depending on the first transaction request to complete a (Continued)

cross-chain transaction. A cross-chain communication device and a storage medium are also disclosed.

14 Claims, 3 Drawing Sheets

(58) Field of Classification Search
CPC ............ G06Q 20/3825; G06Q 20/383; G06Q 20/405; H04L 9/0637; H04L 2209/56; H04L 9/3231; H04L 9/3247; H04L 63/00; H04L 9/50; H04L 63/12; H04L 63/0236; H04L 67/104
See application file for complete search history.

(56) References Cited

U.S. PATENT DOCUMENTS

| | | | |
|---|---|---|---|
| 2020/0175003 A1* | 6/2020 | Jiang | G06Q 20/027 |
| 2022/0094555 A1* | 3/2022 | Roy | G06Q 20/065 |

FOREIGN PATENT DOCUMENTS

| | | | | |
|---|---|---|---|---|
| CN | 109819022 A | * | 5/2019 | |
| CN | 110689434 A | | 1/2020 | |
| CN | 111431903 A | | 7/2020 | |
| CN | 112491846 A | * | 3/2021 | ......... H04L 63/0428 |
| WO | WO-2019170814 A1 | * | 9/2019 | ............ G06F 16/27 |
| WO | WO-2021023200 A1 | * | 2/2021 | |
| WO | WO-2021108978 A1 | * | 6/2021 | |

OTHER PUBLICATIONS

First Office Action issued in counterpart Chinese Patent Application No. 202011324624.0, dated Aug. 6, 2021.

Guo et al., Analysis of cross-chain technology of blockchain, Chinese Journal on Internet of Things, vol. 4, No. 2, pp. 35-48, dated Jun. 30, 2020.

Yang et al., Blockchain-Based Secure Distributed Control for Software Defined Optical Networking, Blockchain Technologies and Applications, pp. 42-54, dated Jun. 30, 2019.

* cited by examiner

CROSS-CHAIN COMMUNICATION METHOD, DEVICE AND STORAGE MEDIUM THEREOF

CROSS-REFERENCE TO RELATED APPLICATIONS

The present application claims priority of Chinese patent application CN202011324624.0 filed on Nov. 23, 2020, the entire contents of which are incorporated herein by reference.

TECHNICAL FIELD

One or more examples of the present disclosure relate to communication technologies, in particular to a cross-chain communication method and a device and a storage medium thereof.

BACKGROUND

Mobile edge computing (MEC), as one of core technologies of the fifth-generation mobile communication (5G) has attracted extensive attentions from academia and industry. As an extension of cloud computing, edge computing technology offers computing services at an edge of a network which is closer to end users. Therefore, resources can be allocated to the edge of the network to provide low-latency and high-speed network services for end users.

However, edge computing still faces enormous challenges in privacy security, resource allocation and other aspects. Data transmitted between edge nodes are vulnerable to man-in-the-middle-attack, snooping attacks and other malicious attacks in the process of communication due to heterogeneity between different edge nodes. These attacks possibly result in privacy violation or malicious tampering of data.

Blockchain, one of the emerging technologies in recent years, is actually a decentralized, secure and reliable distributed database. A blockchain-based system is featured with unforgeability and tamper proofing as it cannot be controlled by any single node during operations. With these advantages, a blockchain is capable of being fully integrated with MEC to effectively solve the security challenges thereof.

In addition, service providers may have their own independent edge computing node groups, e.g., BEC (Baidu Edge Computing) is the edge computing nodes of Baidu AI Cloud. As edge nodes are heterogeneous, direct communications between different edge nodes are unavailable, and task migration among these nodes needs to be taken into consideration. Compared with traditional cloud computing technologies, MEC is more complicated and uncertain. Therefore, blockchain-based edge nodes may be utilized to solve the problems in task migration by means of cross-chain technology. The cross-chain technology has become a hot spot of research. The cross-chain technology is effective in realizing interconnectivity between blockchains and improving their expansibility. Particularly, a notary scheme is one of typical cross-chain technologies, but traditional notary schemes have defects of insufficient node credit, high centralization, etc.

Moreover, the edge computing organically integrates resources with respect to computing, storage and other aspects on the edge of the network to construct a unified service platform for users, which responds to task requests from network edge nodes in time and effectively processes these task requests based on the principle of proximity. However, tasks need to be migrated among edge nodes due to limited capabilities, resources, bandwidth and energy of the edge nodes. Therefore, communications and computing migration among edge nodes are particularly important. As edge nodes are heterogeneous, direct communications between different edge nodes are unavailable. Further, data transmitted between nodes of related art are vulnerable to man-in-the-middle-attack, snooping attacks and other malicious attacks in the process of communication, and these attacks possibly result in privacy violation or malicious tampering of data. There are still shortcomings of cross-chain communication solutions, including high centralization, low cross-chain transaction volume, difficult to practice and excessive cost of communications. Therefore, development of a secure and reliable cross-chain communication method is particularly necessary. That is, a reliable and secure solution is urgently needed to realize safe and efficient communication between different edge nodes.

SUMMARY

In view of the above description, one or more examples of the present disclosure propose a cross-chain communication method to improve credibility of notary nodes, ensure successful cross-chain communication transactions, and further achieve secure communications, task migrations and effective resource scheduling among edge nodes. That is, the method effectively improves the credibility on security of cross-chain communication transactions, protects the edge nodes from malicious attacks during the cross-chain communication and migration, and further raises the level of protection of data privacy.

According some examples of the present disclosure, the cross-chain communication method proposed may include: receiving, by a first edge node of a first blockchain, a first transaction request; performing, by the first edge node, a first validation on the first transaction request; sending, by the first edge node, the first transaction request to a notary node group on condition that the first transaction request passes the first validation; determining, by the notary node group, at least one target notary node according to a preset criterion; performing, by the at least one target notary node, a second validation on the first edge node and a second edge node of a second blockchain corresponding to the first transaction request; and setting up, by the first edge node, a cross-chain communication with the second edge node depending on the first transaction request to complete an cross-chain transaction corresponding to the first transaction request on condition that the first edge node and the second edge node pass the second validation.

Based on the cross-chain communication method, some examples of the present disclosure also provides a cross-chain communication device, which includes a memory, a processor, and a computer program stored in the memory and running in the processor, wherein when executing the program, the processor is to: receive a first transaction request; perform a first validation on the first transaction request; sending the first transaction request to a notary node group on condition that the first transaction request passes the first validation; and set up a cross-chain communication with a second edge node depending on the first transaction request to complete an cross-chain transaction corresponding to the first transaction request on condition that the first edge node and the second edge node pass a second validation performed by the notary node group.

Based on the cross-chain communication method, some other examples of the present disclosure also provides a cross-chain communication device, which includes: a memory, a processor, and a computer program stored in the memory and running in the processor, wherein when executing the program, the processor is to: receive a first transaction request from a first edge node; determine at least one target notary node according to a preset criterion; perform a second validation on the first edge node and a second edge node of a second blockchain corresponding to the first transaction request; and send a cross-chain validation result of the first transaction request to the first edge node.

One or more examples of the present disclosure further provides a non-transitory computer-readable storage medium, wherein the non-transitory computer-readable storage medium stores computer instructions, and the computer instructions are used to make the computer execute the above cross-chain communication method.

As stated above, the cross-chain communication method may include: a first edge node of a first blockchain receives a first transaction request and perform a first validation on the first transaction request; on condition that the first transaction request passes the first validation, the first edge node may send the first transaction request to a notary node group; the notary node group determines at least one target notary node according to a preset criterion; the at least one target notary node performs a second validation on the first edge node and a second edge node of a second blockchain corresponding to the first transaction request; and on condition that both the first edge node and the second edge node pass the second validation, the first edge node may set up a cross-chain communication with the second edge node depending on the first transaction request to complete an cross-chain transaction corresponding to the first transaction request.

It can be seen from the above disclosure that the cross-chain communication method provided by the present disclosure solves security credibility problems in the cross-chain communication between edge nodes based on blockchains by means of optimized notary schemes and maximizes the credibility of the notary nodes to ensure successful cross-chain communication transactions, and further achieve secure communications, task migrations and effective resource scheduling among edge nodes.

Meanwhile, as a blockchain has transparency and traceability, all blockchain-based transaction records are capable of being reviewed in time, thus the security and reliability of cross-chain communication can be improved. Therefore, the method effectively improves the credibility on security of cross-chain transactions, protects the edge nodes from malicious attacks during the cross-chain communications and migrations, and further raises the level of protection of data privacy.

BRIEF DESCRIPTION OF DRAWINGS

In order to explain one or more examples of the present disclosure more clearly, accompanying drawings illustrating examples of the present disclosure are briefly introduced. Obviously, the accompanying drawings are only one or more examples of the present disclosure. Those of ordinary skill in the art may further obtain other accompanying drawings based on these accompanying drawings without paying any creative work.

DETAILED DESCRIPTION OF THE EMBODIMENTS

In order to make objectives, technical solutions, and advantages of the present disclosure clearer, the present disclosure will be further described in detail with reference to specific examples described below together with the accompanying drawings.

It should be noted that, unless otherwise defined, the technical terms or scientific terms used in one or more examples of the present disclosure should have the ordinary meanings understood by persons with ordinary skills in the art. The terms "first", "second" and the like used in one or more examples of the present disclosure do not indicate any order, quantity or importance, but are only used for distinguishing different constituent components. The terms "comprising" or "containing" and the like mean that the element or object appearing in front of the term covers the elements or objects and their equivalents listed after the term, without excluding other elements or objects. The terms such as "connection" or "connected" and the like are not limited to physical or mechanical connections, but may comprise electrical connections, regardless of direct connection or indirect connection. The terms "up", "down", "left", "right" and the like are only used for indicating the relative position relationship. When the absolute position of the described object changes, the relative position relationship may also change accordingly.

Technical solutions of examples of the present disclosure will be described in detail in combination with the accompany drawings.

Figure 1:
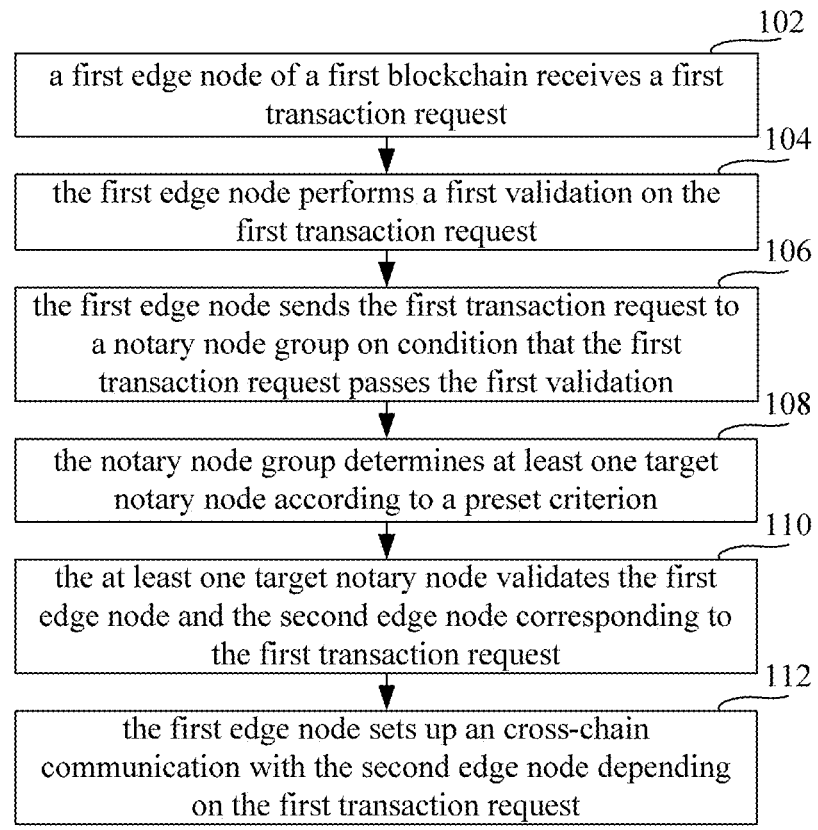
FIG. 1 is a flow chart of a cross-chain communication method according to some examples of the present disclosure.

FIG. 1 is a flow chart of a cross-chain communication method according to some examples of the present disclosure. According to FIG. 1, the cross-chain communication method may include the following steps.

In block 102, a first edge node of a first blockchain receives a first transaction request.

According to some examples of the present disclosure, to implement a cross-chain communication, a user should input the first transaction request through a Blockchain-based Edge Node (BEN) of one blockchain.

To simplify the description, in examples of the present disclosure, the blockchain where the user inputs the first transaction request is called the first blockchain, and the BEN where the user inputs the first transaction request is called the first edge node in these examples.

According to some examples of the present disclosure, the first transaction request may include the address of an edge node to be communicated with, a request message content understood as specific content information to be requested, a smart contract address and a function to be called. In these examples, the edge node to be communicated with is called a second edge node, and the blockchain where the second edge node is located is called a second blockchain.

In block 104, the first edge node performs a first validation on the first transaction request.

According to some examples of the present disclosure, after receiving the first transaction request, the first edge node of the first blockchain may validate the first transaction request first. As an example, after the first edge node receives the first transaction request, miner nodes of the first edge node may first generate a plurality of blocks corresponding to the first transaction request, and then the miner nodes of the first edge node may validate the plurality of blocks corresponding to the first transaction request.

Figure 2:
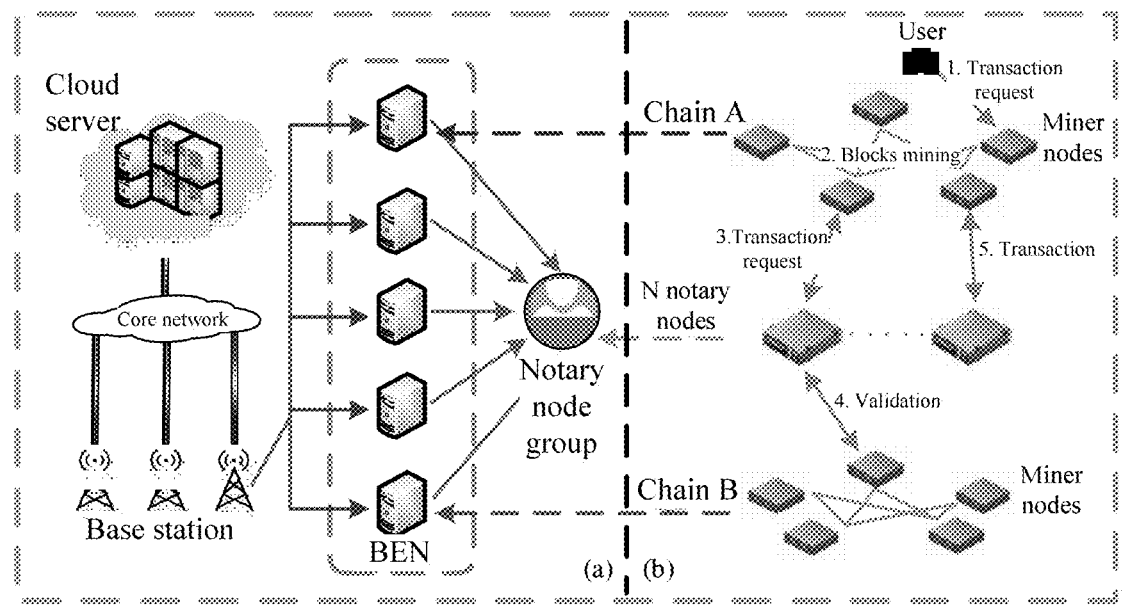
FIG. 2 is a schematic diagram of an exemplary application scenario according to some examples of the present disclosure.

FIG. 2 is a schematic diagram illustrating an exemplary application scenario according to some examples of the present disclosure. According to FIG. 2, in this edge computing scenario, there are 50 BENs from 5 different service providers, with the quantity of BENs distributed as {19, 7, 10, 4, 10}. And there are two blockchains, including chain A and chain B. It assumes that a first BEN (on chain A), that is, a first edge node of a first blockchain, receives a transaction request from a user. That is, the user broadcasts a transaction request to miner nodes of the first BEN, wherein the transaction request includes at least a smart contract address and a function to be called. The transaction request will then be mined into a block by the miner nodes on chain A. The function for calculating a hash value of a block may be understood as a hash function. The hash function may include four independent variables, namely a timestamp, a hash value of a previous block, a Merkle tree and a random number Nounce. To be noted, mining is to find a new block, that is, to find a random number Nounce by means of exhaustive method. Then the miner nodes may validate the transaction request first. The validation may be understood as a mining process. That is, after generating a new block, a miner node should broadcast the new block to other miner nodes and obtain a consensus of all miner nodes. In the consensus process, each miner node would make a preliminary judgment on the user and information of the transaction request to identify normal transaction request and prevent malicious users from making malicious transaction requests. Specifically, the judgment would be made based on a consensus mechanism of blockchain. In a system comprising mistrustful nodes, a necessary and sufficient condition for each node to reach a consensus is that: to maximize their own interests, every node will spontaneously and honestly abide by the preset rules specified in the agreement (for example, the transaction request should be judged whether it exceeds a reasonable range) to judge the authenticity of every transaction.

In block 106, the first edge node sends the first transaction request to a notary node group on condition that the first transaction request passes the first validation.

According to some examples of the present disclosure, on condition that the first transaction request passes the first validation, it means that the first transaction request is a normal transaction request rather than a malicious transaction request. Therefore, after confirming that the first transaction request passes the first validation, the first edge node will send the first transaction request to the notary node group.

In block 108, the notary node group determines at least one target notary node according to a preset criterion.

According to some examples of the present disclosure, FIG. 2 also shows that after receiving the first transaction request, the notary node group may view transaction requests received at regular intervals and list them to ensure that the transaction request (i.e., the first transaction request) may be obtained in time. Moreover, as traditional notary schemes are insufficient in supervision of the nodes and the credit thereof, the credibility of the nodes is not high, thus leading to a certain security risk in the cross-chain process.

Therefore, as an example of the present disclosure, the notary node group may include a plurality of notary nodes. Further, to ensure a secure and reliable information transmission, the notary node group needs to select at least one target notary node depending on the preset criterion. For example, to ensure secure and reliable cross-chain communication transactions, reduce malicious cross-chain transactions and achieve high credibility of notary nodes, a quasi-democratic election method may be employed to select a notary node group, and rank notary nodes in the notary node group in terms of trust degree to determine secure and reliable notary nodes, and assign a permission to top-ranked nodes for validating cross-chain transactions.

Specifically, the notary node group may perform a trust degree rank on the notary nodes of the notary node group to obtain notary nodes ranked in terms of trust degree according to a voting result and credit historical information corresponding to each notary node of the notary node group. Then the notary node group may determine the at least one target notary node from the notary nodes ranked in terms of trust degree according to the preset criterion. Wherein, the preset criterion may be that: the notary node has the trust degree higher than a first ranking threshold among the notary nodes ranked in a descending order of trust degree.

Figure 3:
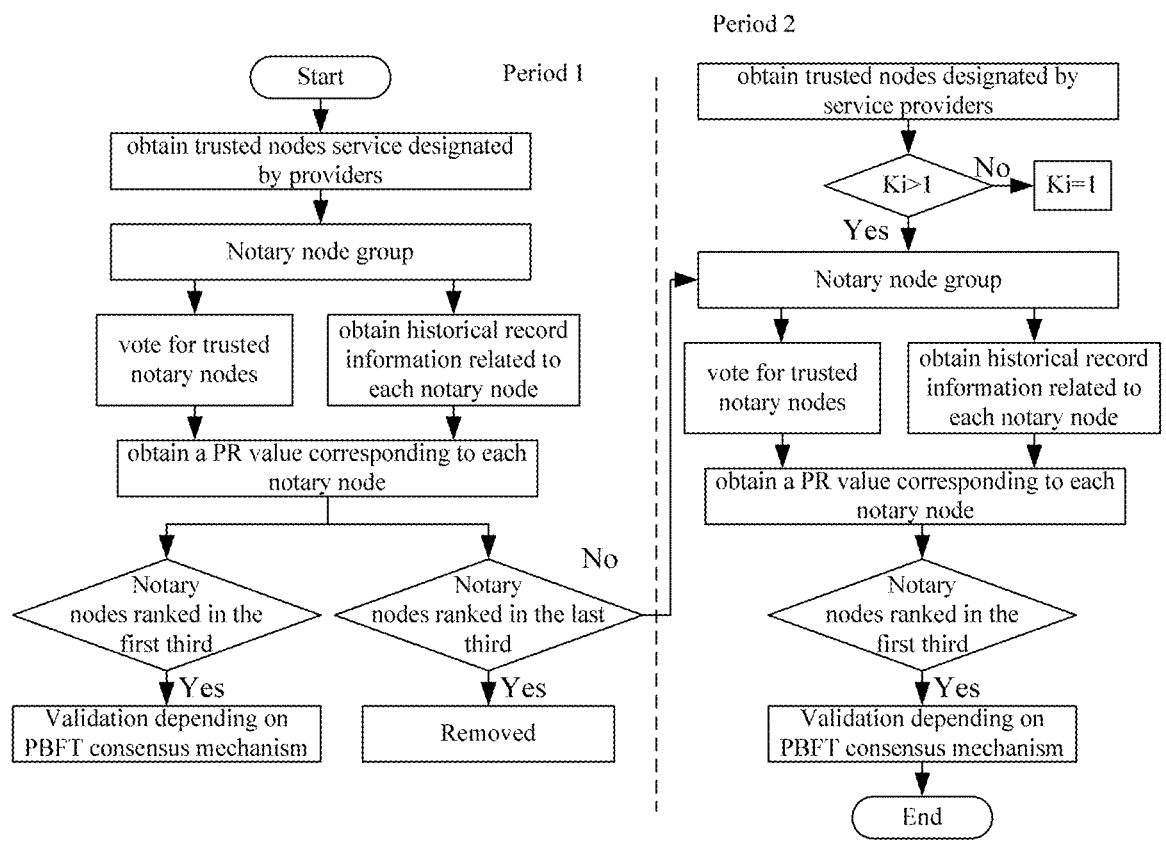
FIG. 3 is a flow chart of a cross-chain communication method according to some other examples of the present disclosure.

Further, an example of the present disclosure is described in combination with FIG. 3. As shown in a part labeled as period 1 of FIG. 3, all notary nodes of the notary node group are capable of voting for their trusted notary nodes respectively. Moreover, the notary node group may obtain historical record information (i.e., credit historical information) related to each notary node collected by a notary node credit evaluation system, wherein the relevant historical record information may contain adverse credit history of nodes, e.g., malicious voting. Then, the above-mentioned information (i.e., trusted notary nodes voted by the notary nodes of the notary node group and the historical record information related to each notary node) may be combined to obtain a PR (PageRank) value corresponding to each notary node of the notary node group by means of a PageRank algorithm, the specific PageRank algorithm formula is as follows:

$$PR(u) = \frac{1-d}{N} + d * \sum_{v \in B_u} \frac{PR(v)}{L(v)}$$

Wherein, PR(v) denotes a PageRank value of notary node v; PR(u) denotes a PageRank value of notary node u; $B_u$ denotes an incoming link set of notary node u, i.e., the set of notary nodes voting for notary node u; L(v) denotes a quantity of outbound links from notary node v, i.e., the total quantity of votes cast by notary node v to other nodes; d is a damping coefficient, which is generally 0.85.

Figure 4:
FIG. 4 is a schematic diagram of a PR value ranking according to some examples of the present disclosure.

Subsequently, the PR values of the notary nodes may be taken as the trust degree of the notary nodes. Then the notary nodes of the notary node group are ranked according to the trust degree. For example, these notary nodes can be ranked in a descending order or an ascending order of trust degree, so as to obtain the notary nodes ranked in terms of trust degree. Following up with that, if the notary nodes are ranked in a descending order of trust degree, the notary nodes ranked in the first third can be determined as the at least one target notary node. That is, the preset criterion is that: the notary node has the trust degree higher than a first ranking threshold among the notary nodes ranked in descending order of trust degree, and the first ranking threshold is determined according to the first third of the rank. For example, if the first ranking threshold is the first third, and assuming that there are 9 notary nodes in the notary node group, then the first ranking threshold is 3. It assumes that the PR values corresponding to notary nodes are as shown in FIG. 4. And the notary nodes are ranked in a descending order based on the PR values of the notary nodes. With the PageRank algorithm, the final credit will be within a range of 0-1. After ranking, the notary nodes ranked in the first third (i.e., the top seven, numbered as 2, 9, 3, 6, 16, 1, 7) may be selected as the target notary nodes.

It should be noted that, FIG. 2 further shows that service providers may designate trusted nodes to the notary node group after the notary node group receives the first transaction request. Specifically, in one example, before the notary node group determines the at least one target notary node according to the preset criterion, the method may further include the following step.

On condition that the number of the notary nodes of the notary node group are insufficient to meet an expected quantity, the notary node group may obtain trusted nodes pushed by a plurality of service providers.

For example, assuming that a preset quantity of the notary nodes of the notary node group is 20, on condition that the notary nodes of the notary node group are insufficient to meet the quantity of 20, the notary node group may obtain trusted nodes designated by a plurality of service providers.

Subsequently, according to sizes of the service providers, the notary node group may determine at least one target trusted node for each service provider from the trusted nodes designated thereby.

Specifically, to ensure fairness, each service provider should have at least one notary node in the notary node group. Therefore, it is necessary to ensure that every service provider designates a trusted node to the notary node group by means of a leader election algorithm, regardless of the size of the service provider. In addition, the quantity of trusted nodes designated by each service provider to the notary node group should be in proportion to the size of the service provider. For example, the final quantity of notary nodes of each service provider is obtained by means of the formula below:

$$N_i = \left\lceil \frac{d_i}{\sum_{0}^{n} d_i} \times (Q-n) \right\rceil, i \in n$$

Wherein, $N_i$ denotes a quantity of trusted nodes designated by a plurality of service providers to the notary node group in period 1 (i.e., the first transaction request is the Nth transaction request obtained by the first edge node, and N is odd); $d_i$ denotes a quantity of BENs owned by each service provider; Q denotes a total quantity of notary nodes owned by the notary node group; i denotes a serial number of each service provider; n denotes a total quantity of service providers. The formula described is a general formula, and the brackets denote rounding symbols. In practice, the quantity of nodes designated by service providers will be rounded according to actual sizes of these service providers to ensure a constant Q value.

Subsequently, the target trusted node for each service provider may be added to the notary node group as a notary node.

According to some examples of the present application, after determining the at least one target notary node from the notary nodes ranked in terms of trust degree according to the preset criterion, the method may further include the following step.

On condition that the first transaction request is the Nth transaction request obtained by the first edge node and N is odd (i.e., period 1 corresponding to FIG. 2), among the notary nodes ranked in descending order of trust degree, removing the notary nodes with the trust degrees lower than a second ranking threshold from the notary node group.

Further, the example of the present disclosure will be continuously described in combination with FIG. 3. It assumes that the second ranking threshold is two-thirds of the rank, then the top 14 results of the PR values obtained in FIG. 3 are retained, and the rest should be removed from the notary node group. In one implementation, to keep a constant quantity of nodes in the notary node group, a formula $$M_i = \left\lceil \frac{d_i}{\sum_{0}^{n} d_i} \times \frac{Q}{3} \right\rceil,$$

i∈n is utilized to continuously select nodes from the service providers until the expected quantity is reached.

In examples provided by the present disclosure, the quantity of trusted nodes designated by each service provider may be greater than 1, thus ensuring that all service providers have their own trusted nodes sent to the notary node group. In other words, the example takes the lowliest place elimination principle. When the first transaction request is processed (i.e., period 1 corresponding to FIG. 2), after the notary nodes ranked in terms of trust degree are announced without objection, the notary nodes ranked in the last third are automatically eliminated from the notary node group, while new nodes of the notary node group will be selected from the service providers during the process of a second transaction request (i.e., period 2 corresponding to FIG. 2). The second transaction request occurs after the first transaction request. That is, the second transaction request is the Mth transaction request obtained by the first edge node, and M is even. That is, when the first transaction request is processed (i.e., period 1 corresponding to FIG. 2), the nodes ranked above the last third of the notary nodes ranked in terms of trust degrees are directly sent to the notary node group in period 2. It should be noted that the process of processing the second transaction request (the second transaction request occurs after the first transaction request) is completely the same as the first transaction request, except the selecting criterion of notary node group.

It should be noted that, in one implementation, after determining the at least one target notary node from the notary nodes ranked in terms of trust degree according to the preset criterion, the method may further include the following step.

On condition that the first transaction request is the Nth transaction request obtained by the first edge node and N is even (i.e., period 2 corresponding to FIG. 2), removing all notary nodes from the notary node group. Then the notary node group obtains the trusted nodes pushed by each service provider. Subsequently, according to sizes of the service providers, the notary node group determines a target trusted node for each service provider from the trusted nodes pushed thereby. For example, with the formula $$M_i = \left[\frac{d_i}{\sum_0^n d_i} \times \frac{Q}{3}\right],$$

i∈ n, the notary node group determines a target trusted node for each service provider from the trusted nodes pushed thereby. And the notary node group adds the target trusted node for each service provider to the notary node group as the notary node. For example, if the constant quantity Q of notary nodes of the notary node group is 20, according to the sizes of different service providers, with the formula $$N_i = \left[\frac{d_i}{\sum_0^n d_i} \times (Q-n)\right],$$

i∈ n, the nodes $N_i[i|i=1,2,3,4,5]=\{7,3,4,2,4\}$ will be obtained and renumbered from 1 to 20. That is, in this example, after two validations of transaction request, all notary nodes of the notary node group will be removed and replaced with notary nodes re-elected. All of these steps are repeated in a way that enables the cross-chain transactions to be carried out securely and reliably, and continuously improves the credibility of the notary nodes.

In block 110, the at least one target notary node validates the first edge node and the second edge node of the second blockchain corresponding to the first transaction request.

According to some examples of the present disclosure, when the target notary node finds a new transaction request in an unlisted message queue, it will retrieve the new transaction request, obtain specific content of new transaction request and user signature corresponding to the new transaction request, and validate the new transaction request. Meanwhile, the at least one target notary node may qualify the second edge node respectively. If both of the first edge node and the second edge node pass the validation, the target notary node may consider that the first edge node is permitted to communicate with the second edge node.

As an example, the at least one target notary node may validate the first edge node according to the request message content and user signature corresponding to the first edge node. The at least one target notary node may qualify the second edge node of the second blockchain corresponding to the first transaction request.

Specifically, as a highly trusted third party, the at least one target notary node may view relevant messages of the first edge node and the second edge node. That is, after receiving the first transaction request, the at least one target notary node will validate the first transaction request by comparing with the requirements of the smart contract of the first transaction request. The first edge node meeting the request conditions of the smart contract will pass the validation. For example, if the first edge node requires services from the second edge node, the at least one target notary node should validate the honest user signature of the first edge node, and then validate the qualification of the first edge node, that is, whether the first edge node is capable of exchanging for the services of the second edge node depending on the smart contract of the first transaction request. Moreover, the at least one target notary node should validate the second edge node is enabled to provide the necessary transaction request for the first edge node according to the smart contract of the first transaction request.

It should be noted that, to further ensure the success of cross-chain communications, in one implementation, FIG. 2 shows that before the at least one target notary node validates the first edge node and the second edge node of the second blockchain corresponding to the first transaction request, the method may further include the following step.

The at least one target notary node validates the first transaction request depending on the Practical Byzantine Fault Tolerance (PBFT) consensus mechanism.

Wherein, PBFT mechanism may designate one node in the blockchain system as a primary node (or a leader node, that is, the node with the highest default credit), and designate other nodes as secondary nodes (backup nodes). When the primary node fails, any legal node in the system is eligible to be upgraded from the secondary node to the primary node. The principle that the minority is subordinate to the majority is followed to ensure that honest nodes reach a consensus. However, to run PBFT mechanism normally, the quantity of malicious nodes must be less than one third of the total quantity of nodes in the network. That is, if the quantity of malicious nodes is m, the consensus is reached when the total quantity of nodes reaches 3m+1. In other words, to reach a consensus successfully, at least two-thirds of the nodes in the system are honest. Specifically, the operation of PBFT mechanism is divided into four periods: 1. the user sends a transaction request to the primary node; 2. the primary node broadcasts the transaction request to all secondary nodes; 3. the primary node and secondary nodes jointly complete the transaction request and send response corresponding to the transaction request to the user; and 4. when the user receives 2m+1 identical responses from nodes in the network (m denotes the maximum allowable quantity of malicious nodes in the network), it means that the transaction request is completed.

Accordingly, according to some examples of the present disclosure, the at least one target notary node validates the first edge node and the second edge node of the second blockchain corresponding to the first transaction request may include the following step:

On condition that the first transaction request passes the validation, the at least one target notary node will validate the first edge node and the second edge node of the second blockchain corresponding to the first transaction request.

In block 112: on condition that both the first edge node and the second edge node pass the validation, the first edge node sets up a cross-chain communication with the second edge node depending on the first transaction request to complete a cross-chain transaction.

According to some examples of the present disclosure, on condition that both the first edge node and the second edge node pass the validation, it means that the at least one target notary node confirms that the first edge node is permitted to set up a transaction with the second edge node. After the validation on the first edge node and the second edge node, the at least one target notary node may send the validation result to the first edge node and the second edge node respectively. Then the first edge node and the second edge node may start the cross-chain transaction. Specifically, on condition that both the first edge node and the second edge node pass the validation, the second edge node may forward its services (such as computing resources, bandwidth resources, and etc.) to-be-provided to the first edge node to the notary node group and meanwhile the first edge node may forward its costs to-be-paid to the second edge node to the notary node group. Then, the notary node group may forward the services provided by the second edge node to the first edge node and forward the costs provided by the first edge node to the second edge node. In this way, the cross-chain transaction is completed.

Further, an example is described in combination with example and FIG. 2. As shown in FIG. 2, the at least one target notary node may first validate the first edge node based on the requirements contained in the first transaction request. That is, the at least one target notary node first validates the qualification of the first edge node to confirm whether the first edge node can pay for the services requested by itself. On condition that the first edge node passes the validation, the at least one target notary node may send the validation result of the first edge node to the miner nodes in chain A (i.e., the first edge node). That is, the at least one target notary node broadcasts the validation result of the first edge node to the miner nodes in chain A. Thus, the validation result can be mined into a block on chain A of the first blockchain and the miner nodes may then update their data accordingly.

After the validation on the first edge node, the at least one target notary node may further validate the second edge node based on the requirements contained in the first transaction request. That is, the at least one target notary node further validates the qualification of the second edge node to confirm whether the second edge node can provide services requested by the first edge node. On condition that the second edge node passes the validation, the at least one target notary node may send the validation result of the second edge node to the miner nodes in chain B (i.e., the second edge node). That is, the at least one target notary node broadcasts the validation result of the second edge node to the miner nodes in chain B. Thus, the validation result can be mined into a block on chain B of the second blockchain and the miner nodes may then update their data accordingly.

It should be noted that the order of the validations disclosed above is just an example. In some other examples of the present disclosure, the at least one target notary node may first validate the second edge node and then validate the first edge node.

Then, on condition that both the first edge node and the second edge node pass the validation, the second edge node may forward its services (such as computing resources, bandwidth resources, and etc.) to-be-provided to the first edge node to the notary node group and meanwhile the first edge node may forward its costs to-be-paid to the second edge node to the notary node group. Then, the notary node group may forward the services provided by the second edge node to the first edge node according to address of the first edge node recorded in the second edge node. And at the same time, the notary node group may forward the qualification of the first edge node to the second edge node according to address of the second edge node recorded in the first edge node. In this way, the cross-chain transaction is successfully completed. To be noted, the address of the first edge node may be preset in the second edge node, and the address of the second edge node may be preset in the first edge node. In some examples, the notary node group may obtain the address of the first edge node and the address of the second edge node from the first transaction request.

It can be understood that the notary node group sends the cross-chain validation result to the miner nodes in chain A, comprising the smart contract address, the transaction content and the validation result. The cross-chain validation result of the first transaction request is mined into the blockchain of chain A. And the miner nodes of chain A read the transaction from the blockchain and update the local data accordingly.

One or more examples of the present disclosure provide a cross-chain communication method, which includes: a first edge node of a first blockchain receives a first transaction request and validates the first transaction request; on condition that the first transaction request passes the validation, the first edge node will send the first transaction request to a notary node group; the notary node group determines at least one target notary node according to a preset criterion; the at least one target notary node validates the first edge node and a second edge node of a second blockchain corresponding to the first transaction request; and on condition that both the first edge node and the second edge node pass the validation, the first edge node will set up a cross-chain communication with the second edge node depending on the first transaction request to complete a cross-chain transaction corresponding to the first transaction request. It can be seen that the cross-chain communication method provided by the present disclosure solves the security credibility problem in cross-chain communications between edge computing nodes based on blockchains by means of the optimized notary schemes and maximizes the credibility of the notary nodes to ensure successful cross-chain communication transactions, and further achieve the secure communication, task migration and effective resource scheduling among edge nodes. Meanwhile, as a blockchain has transparency and traceability, all blockchain-based transaction records are capable of being reviewed in time. Thus, the security and reliability of cross-chain communication can be improved. That is, the method may effectively improve the credibility on security of cross-chain transactions, protect the edge nodes from malicious attacks during the cross-chain communication and migration, and further raise the level of protection of data privacy.

Figure 5:
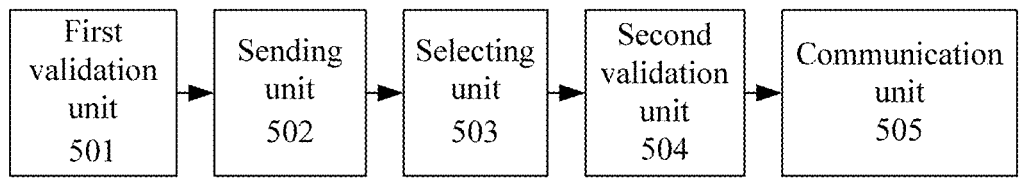
FIG. 5 is a schematic diagram illustrating an internal structure of a cross-chain communication device according to some examples of the present disclosure.

As shown in FIG. 5, one or more examples of the present disclosure provide a cross-chain communication device, which includes: a first validation unit 501, a sending unit 502, a selecting unit 503, a second validation unit 504 and a communication unit 505. The cross-chain communication device is employed in an edge node.

The first validation unit 501 performs a first validation on a first transaction request after receiving the first transaction request.

The sending unit 502 sends the first transaction request to the notary node group.

The selecting unit 503 determines the target notary node according to a preset criterion.

The second validation unit 504 performs a second validation on the first edge node and a second edge node of a second blockchain corresponding to the first transaction request.

The communication unit 505 sets up a cross-chain communication with the second edge node depending on the first transaction request to complete a cross-chain transaction corresponding to the first transaction request on condition that the first edge node and the second edge node pass the second validation.

According to some examples of the present disclosure, the first validation unit 501 generates a plurality of blocks corresponding to the first transaction request; and validates the plurality of blocks corresponding to the first transaction request.

According to some examples of the present disclosure, the selecting unit 503 performs a trust degree rank on the notary nodes of the notary node group to obtain notary nodes ranked in terms of trust degree according to a voting result and credit historical information corresponding to each notary node of the notary node group; and determines the at least one target notary node from the notary nodes ranked in terms of trust degree according to a preset criterion; wherein, the preset criterion comprises at least one notary node has a trust degree higher than a first ranking threshold among the notary nodes ranked in a descending order of the trust degree.

According to some examples of the present disclosure, the second validation unit 504 validates the first edge node according to the request message content and user signature corresponding to the first edge node; and qualifies that the second edge node of the second blockchain corresponding to the first transaction request.

According to some examples of the present disclosure, the communication unit 505 obtains a cross-chain validation result of the first transaction request by means of the second edge node on condition that the first edge node and the second edge node pass the second validation; and returns the cross-chain validation result of the first transaction request to the first edge node to complete the cross-chain transaction corresponding to the first transaction request.

Based on the above cross-chain communication method, some examples of the present disclosure disclose a cross-chain communication device. This a cross-chain communication device is employed in an edge node. The device may include: a memory, a processor, and a computer program stored in the memory and running in the processor, wherein when executing the program, the processor is to: receive a first transaction request; perform a first validation on the first transaction request; sending the first transaction request to a notary node group on condition that the first transaction request passes the first validation; and sets up a cross-chain communication with a second edge node depending on the first transaction request to complete an cross-chain transaction corresponding to the first transaction request on condition that the first edge node and the second edge node pass a second validation performed by the notary node group.

According to some examples of the present disclosure, the processor in the above device is further to generate a plurality of blocks corresponding to the first transaction request; and validate the plurality of blocks corresponding to the first transaction request.

According to some examples of the present disclosure, the processor in the above device is further to receive a cross-chain validation result of the first transaction request; and update local data depending on the cross-chain validation result.

Based on the above cross-chain communication method, some examples of the present disclosure disclose a cross-chain communication device. This a cross-chain communication device is employed in a notary node group. The device may include: a memory, a processor, and a computer program stored in the memory and running in the processor, wherein when executing the program, the processor is to: receive a first transaction request from a first edge node; determine at least one target notary node according to a preset criterion; perform a second validation on the first edge node and a second edge node of a second blockchain corresponding to the first transaction request; and send a cross-chain validation result of the first transaction request to the first edge node.

According to some examples of the present disclosure, the processor in the above device is further to: perform a trust degree rank on the notary nodes of the notary node group to obtain notary nodes ranked in terms of trust degree according to a voting result and credit historical information corresponding to each notary node of the notary node group; and determine the at least one target notary node from the notary nodes ranked in terms of trust degree according to a preset criterion; wherein, the preset criterion comprises at least one notary node has a trust degree higher than a first ranking threshold among the notary nodes ranked in a descending order of the trust degree.

According to some examples of the present disclosure, the processor in the above device is further to validate the first edge node according to the request message content and user signature corresponding to the first edge node; and qualify that the second edge node of the second blockchain corresponding to the first transaction request.

According to some examples of the present disclosure, the processor in the above device is further to: obtain trusted nodes pushed by a plurality of service providers on condition that the notary nodes of the notary node group are insufficient to meet an expected quantity, before determining the at least one target notary node; determine at least one target trusted node for each service provider from the trusted nodes according to sizes of the service providers; and add the at least target trusted node for each service provider to the notary node group as a notary node.

According to some examples of the present disclosure, the processor in the above device is further to: remove the notary nodes with the trust degrees lower than a second ranking threshold from the notary node group on condition that the first transaction request is the Nth transaction request obtained by the first edge node and N is odd, after determining the at least one target notary node from the notary nodes ranked in terms of trust degree according to the preset criterion; and remove all notary nodes from the notary node group on condition that the first transaction request is the Nth transaction request obtained by the first edge node and N is even, after determining the at least one target notary node from the notary nodes ranked in terms of trust degree according to the preset criterion.

One or more embodiments of the present disclosure provide a cross-chain communication system, comprising a first edge node of a first blockchain, a notary node group and a second edge node of a second blockchain.

The first edge node of the first blockchain receives a first transaction request and performs a first validation on the first transaction request. Further, the first edge node sends the first transaction request to the notary node group on condition that the first transaction request passes the first validation.

The notary node group determines at least one target notary node according to a preset criterion. Then the target notary node performs a second validation on the first edge node and the second edge node of the second blockchain corresponding to the first transaction request.

At last, on condition that both the first edge node and the second edge node pass the second validation, the first edge node will set up a cross-chain communication with the second edge node depending on the first transaction request to complete a cross-chain transaction corresponding to the first transaction request.

Technical carriers related to the payment described in the embodiments of the present disclosure may include, for example, Near Field Communication (NFC), WIFI, 3G/4G/5G, card swiping technology at Point of Sale (POS), QR code scanning technology, bar code scanning technology, Bluetooth, infrared, Short Message Service (SMS) and Multimedia Message Service (MMS).

The biometric characteristics related to the biometric identification described in the embodiment of the present disclosure may include, for example, eye print, voiceprint, fingerprint, palmprint, heartbeat, pulse, chromosome, DNA and human bitemarks. The eye print comprises iris, sclera and other biometric characteristics.

It should be noted that the method of one or more embodiments of the present disclosure may be performed by means of a single device, e.g., a computer or a server. The method of the embodiment is also capable of being used in distributed scenarios and completed by cooperation of a plurality of devices. In these distributed scenarios, one of a plurality of devices may only perform one or more steps of the method according to one or more embodiments of the present disclosure, and a plurality of devices will complete the method by interacting with each other.

The particular embodiment of the present disclosure is described. The other embodiments are within the scope of the present claims. In some cases, the actions or steps recited in the claims may be performed in a different order than that in the embodiments and still achieve the desired results. In addition, the processes depicted in the accompanying figures do not necessarily require the particular order shown, or sequential order, to achieve desirable results. In some embodiments, multitasking and parallel processing are permissible or may be beneficial.

For better description, the device is described with various modules divided by functions. Of course, for implementing one or more embodiments of the present disclosure, the functions of the modules can be realized in one or more software and/or hardware.

The device described in the embodiment is used to realize the corresponding method in the embodiments and has the beneficial effects corresponding to the embodiments of the method and will not be reiterated here.

Figure 6:
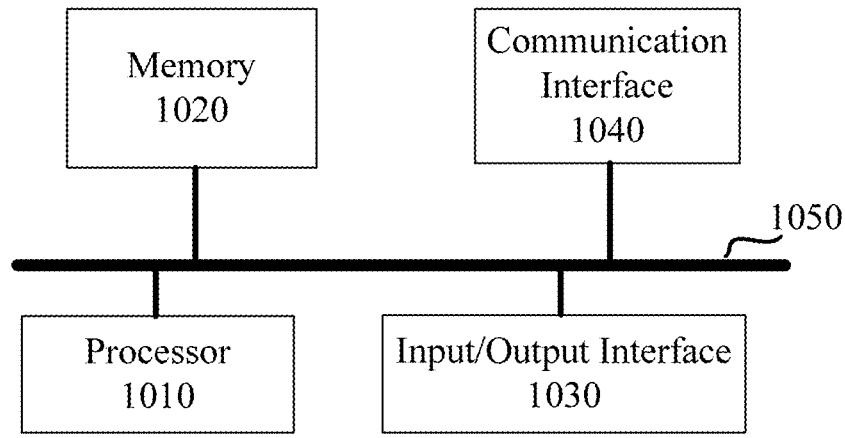
FIG. 6 is a schematic diagram illustrating an internal structure of an electronic device according to some examples of the present disclosure.

FIG. 6 shows a more specific hardware structural diagram of an electronic device provided by the embodiment, comprising a processor 1010, a memory 1020, an input/output interface 1030, a communication interface 1040 and a bus 1050. The processor 1010, the memory 1020, the input/output interface 1030 and the communication interface 1040 realize the communication connection in the device by means of the bus 1050.

The processor 1010 may be realized in the form of a general-purpose Central Processing Unit (CPU), a microprocessor, a Request Specific Integrated Circuit (ASIC), or one or more integrated circuits, etc. to perform relevant programs, thus realizing the technical solutions provided by the embodiments of the present disclosure.

The memory 1020 may be realized in the form of Read Only Memory (ROM), Random Access Memory (RAM), static storage device, dynamic storage device and the like. The memory 1020 may store an operating system and other application programs. When the technical solutions provided by the embodiments of the present disclosure is implemented by means of software or firmware, related program codes are stored in the memory 1020 and called and executed by the processor 1010.

The input/output interface 1030 is used to connect to an input/output module to realize information input and output. The input/output module may be arranged as a component in the equipment (not shown), or externally connected to the equipment to provide corresponding functions. The input equipment may comprise a keyboard, a mouse, a touch screen, a microphone and a plurality of sensors, and the output equipment may comprise a display, a speaker, a vibrator and an indicator light.

The communication interface 1040 is used to connect to a communication module (not shown) to realize a communication interaction between the equipment and other equipment. The communication module may communicate by wired means (e.g., USB and network cable) or wireless means (e.g., mobile network, WIFI and Bluetooth).

The bus 1050 comprises a path transferring information among a plurality of components of the equipment, e.g., the processor 1010, the memory 1020, the input/output interface 1030 and the communication interface 1040.

It should be noted that although the equipment only shows the processor 1010, the memory 1020, the input/output interface 1030, the communication interface 1040 and the bus 1050, the equipment may further comprise other components necessary for normal operation in the specific implementation process. In addition, it should be understood by those of ordinary skill in the art that the equipment may only comprise components necessary for realizing the solution of the embodiments of the present disclosure, but not necessarily comprise all the components shown in the figures.

The computer readable medium of the embodiment includes volatile, non-volatile, movable and non-movable media, which may realize information storage by means of any method or technology. The information may be computer readable instruction, data structure, program module or other data. The example of computer storage medium includes but not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read only memory (CD-ROM), digital versatile disc (DVD) or other optical memories, cassette magnetic tape, tape, magnetic disk storage or other magnetic memory devices or any other non-transmission media, which can store information accessible by the computing device.

Those of ordinary skill in the art should understand that: any of the embodiments in discussion is exemplary only and not implicitly intended to limit the scope of the present disclosure (including the claims); based on the concept of the present disclosure, the technical features of the embodiment or different embodiments can also be combined, the steps can be performed in any order, and there are many other changes in different aspects of one or more embodiments of the present disclosure, which are not provided in detail for brevity.

In addition, to simplify the description and discussion and avoid obscuring a clear understanding of one or more embodiments of the present disclosure, well-known power/ground connection with integrated circuit (IC) chips and other components may or may not be shown in the figures. In addition, the devices can be shown in the form of block diagrams to avoid obscuring a clear understanding of one or more embodiments of the present disclosure, and it also considers the fact that the details about the implementation of these devices in block diagrams are highly dependent on the platform whereon one or more embodiments of the present disclosure will be implemented (i.e., these details should within the understanding of those of ordinary skill in the art). While specific details (e.g., circuits) have been elaborated to describe the exemplary embodiment of the present disclosure, it is apparent to those of ordinary skill in the art that one or more embodiments of the present disclosure can be implemented without these details or with changes therein. Therefore, the description should be considered to be illustrative instead of limitation thereto.

Although the present disclosure has been described in combination with specific embodiments thereof, many replacements, modifications and alterations of the embodiments will be apparent to those of ordinary skill in the art according to the preceding part of the text. For example, other memory architectures (e.g., dynamic RAM (DRAM)) may employs the embodiment in discussion.

One or more embodiments of the present disclosure are intended to cover all such replacements, modifications and alterations that fall into the broad protection scope as defined in the claims. It should be pointed out that, all omissions, alterations, equivalent replacements and improvements, without departing from the spirit and principle of the present disclosure, should fall within the protection scope of the present disclosure.

What is claimed is:

1. A cross-chain communication method, comprising:
receiving, by a first edge node of a first blockchain, a first transaction request;
performing, by the first edge node, a first validation on the first transaction request;
sending, by the first edge node, the first transaction request to a notary node group on condition that the first transaction request passes the first validation;
determining, by the notary node group, at least one target notary node according to a preset criterion; wherein, the notary node group comprises a plurality of notary nodes;
performing, by the at least one target notary node, a second validation on the first edge node and a second edge node of a second blockchain corresponding to the first transaction request; and
setting up, by the first edge node, a cross-chain communication with the second edge node depending on the first transaction request to complete a cross-chain transaction corresponding to the first transaction request on condition that the first edge node and the second edge node pass the second validation; wherein,
determining, by the notary node group, at least one target notary node according to the preset criterion comprises:
voting, by each notary node of the notary node group, for its trusted notary nodes to obtain voting results;
obtaining, by the notary node group, historical record information related to each notary node;
obtaining a PageRank (PR) value corresponding to each notary node of the notary node group by means of a PageRank algorithm by combining the voting results and the historical record information; wherein, the PR values of the notary nodes can be obtained based on the following equation:

$$PR(u) = \frac{1-d}{N} + d * \sum_{v \in B_u} \frac{PR(v)}{L(v)}$$

wherein, PR(v) denotes a PageRank value of notary node v; PR(u) denotes a PageRank value of notary node u; $B_u$ denotes a set of notary nodes voting for notary node u; L(v) denotes a total quantity of votes cast by notary node v to other nodes; and d is a damping coefficient; N denotes the number of notary nodes of the notary node group;
taking the PR values of the notary nodes as trust degrees of the notary nodes;

ranking the notary nodes according to the trust degrees of the notary nodes; and
determining the at least one target notary node from the notary nodes ranked in terms of trust degree according to the preset criterion; wherein, the preset criterion comprises the at least one notary node has a trust degree higher than a first ranking threshold among the notary nodes ranked in a descending order of the trust degrees.

2. The cross-chain communication method according to claim 1, wherein, performing, by the first edge node, a first validation on the first transaction request comprises:
generating, by a miner node of the first blockchain, a plurality of blocks corresponding to the first transaction request; and
validating, by the miner node, the plurality of blocks corresponding to the first transaction request.

3. The cross-chain communication method according to claim 1, wherein, performing, by the at least one target notary node, a second validation on the first edge node and a second edge node of a second blockchain corresponding to the first transaction request comprises:
validating, by the at least one target notary node, the first edge node according to the request message content and user signature corresponding to the first edge node; and
qualifying, by the at least one target notary node, that the second edge node of the second blockchain corresponding to the first transaction request.

4. The cross-chain communication method according to claim 1, further comprising:
validating, by the at least one target notary node, the first transaction request depending on a Practical Byzantine Fault Tolerance (PBFT) consensus mechanism before performing the second validation.

5. The cross-chain communication method according to claim 1, further comprising:
obtaining, by the notary node group, trusted nodes pushed by a plurality of service providers on condition that the notary nodes of the notary node group are insufficient to meet an expected quantity, before determining the at least one target notary node;
determining, by the notary node group, at least one target trusted node for each service provider from the trusted nodes according to sizes of the service providers; and
adding, by the notary node group, the at least one target trusted node for each service provider to the notary node group as a notary node.

6. The cross-chain communication method according to claim 1, wherein, setting up, by the first edge node, a cross-chain communication with the second edge node depending on the first transaction request comprises:
forwarding, by the first edge node, its costs to-be-paid to the second edge node to the notary node group;
forwarding, by the second edge node, its services to-be-provided to the first edge node to the notary node group;
forwarding, by the notary node group, the services to the first edge node; and
forwarding, by the notary node group, the costs to the second edge node.

7. The cross-chain communication method according to claim 6, further comprising:
broadcasting, by the at least one target notary node, a validation result of the first edge node to miner nodes of the first blockchain;

mining, by the miner nodes of the first blockchain, a block on the first blockchain based on the validation result of the first edge node;

updating, by the miner nodes of the first blockchain, data accordingly;

broadcasting, by the at least one target notary node, a validation result of the second edge node to miner nodes of the second blockchain;

mining, by the miner nodes of the second blockchain, a block on the second blockchain based on the validation result of the second edge node; and updating, by the miner nodes of the second blockchain, data accordingly.

8. The cross-chain communication method according to claim 1, further comprising:

removing the notary nodes with the trust degrees lower than a second ranking threshold from the notary node group on condition that the first transaction request is the $M^{th}$ transaction request obtained by the first edge node and M is odd, after determining the at least one target notary node from the notary nodes ranked in terms of trust degree according to the preset criterion.

9. The cross-chain communication method according to claim 1, further comprising:

removing all notary nodes from the notary node group on condition that the first transaction request is the $M^{th}$ transaction request obtained by the first edge node and M is even, after determining the at least one target notary node from the notary nodes ranked in terms of trust degree according to the preset criterion.

10. A cross-chain communication device, comprising:

one or more processors, one or more memories, and a communication bus configured to couple the one or more processors and the one or more memories; wherein the one or more memories store one or more instructions, and when executed by the one or more processors, the instructions cause the one or more processors to:

receive a first transaction request from a first edge node;

obtain voting results from each notary node of a notary node group voting for its trusted notary nodes;

obtain historical record information related to each notary node of the notary node group;

obtain a PageRank (PR) value corresponding to each notary node of the notary node group by means of a PageRank algorithm by combining the voting results and the historical record information; wherein, the PR values of the notary nodes can be obtained based on the following equation:

$$PR(u) = \frac{1-d}{N} + d * \sum_{v \in B_u} \frac{PR(v)}{L(v)}$$

wherein, PR(v) denotes a PageRank value of notary node v; PR(u) denotes a PageRank value of notary node u; $B_u$ denotes a set of notary nodes voting for notary node u; L(v) denotes a total quantity of votes cast by notary node v to other nodes; and d is a damping coefficient; N denotes the number of notary nodes of the notary node group;

take the PR values of the notary nodes as trust degrees of the notary nodes;

rank the notary nodes according to the trust degrees of the notary nodes;

determine at least one target notary node from the notary nodes ranked in terms of trust degree according to the preset criterion; wherein, the preset criterion comprises the at least one notary node has a trust degree higher than a first ranking threshold among the notary nodes ranked in a descending order of the trust degrees;

perform a second validation on the first edge node and a second edge node of a second blockchain corresponding to the first transaction request; and send a cross-chain validation result of the first transaction request to the first edge node.

11. The cross-chain communication device according to claim 10, wherein, the instructions cause the one or more processors to:

validate the first edge node according to the request message content and user signature corresponding to the first edge node; and qualify that the second edge node of the second blockchain corresponding to the first transaction request.

12. The cross-chain communication device according to claim 10, wherein, the instructions cause the one or more processors to:

obtain trusted nodes pushed by a plurality of service providers on condition that the notary nodes of the notary node group are insufficient to meet an expected quantity, before determining the at least one target notary node;

determine at least one target trusted node for each service provider from the trusted nodes according to sizes of the service providers; and add the at least one target trusted node for each service provider to the notary node group as a notary node.

13. The cross-chain communication device according to claim 10, wherein, the instructions cause the one or more processors to:

remove the notary nodes with the trust degrees lower than a second ranking threshold from the notary node group on condition that the first transaction request is the $M^{th}$ transaction request obtained by the first edge node and M is odd, after determining the at least one target notary node from the notary nodes ranked in terms of trust degree according to the preset criterion; and remove all notary nodes from the notary node group on condition that the first transaction request is the $M^{th}$ transaction request obtained by the first edge node and M is even, after determining the at least one target notary node from the notary nodes ranked in terms of trust degree according to the preset criterion.

14. A non-transitory computer-readable storage medium having computer executable instructions stored thereon for execution by a processor, that when executed by the processor, preform the cross-chain communication method of claim 1.

* * * * *